No. 772,654. Patented October 18, 1904.

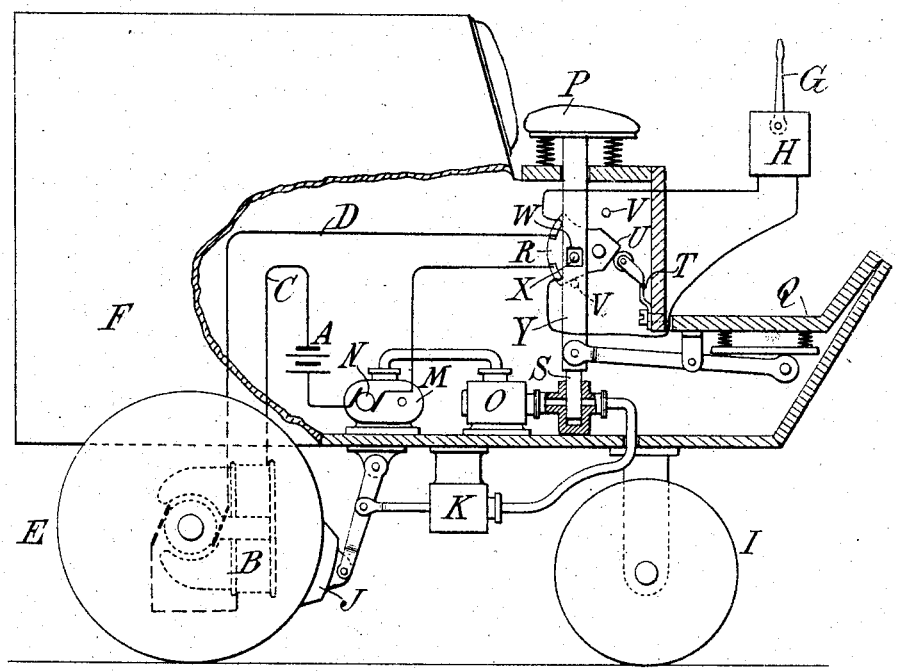

UNITED STATES PATENT OFFICE.

GEORGE HOLT FRASER, OF BROOKLYN, NEW YORK.

SAFETY DEVICE FOR VEHICLES OR OTHER APPARATUS.

SPECIFICATION forming part of Letters Patent No. 772,654, dated October 18, 1904.

Application filed January 22, 1900. Serial No. 2,315. (No model.)

*To all whom it may concern:*

Be it known that I, GEORGE HOLT FRASER, a citizen of the United States, residing in the borough of Brooklyn, county of Kings, city and State of New York, have invented certain new and useful Improvements in Safety Devices for Vehicles or other Apparatus, of which the following is a specification.

This invention relates to safety devices for power-driven appliances, and aims to provide certain improvements therein. To this end I provide improvements which will be hereinafter fully set forth as applied to a conveyance, referring to the accompanying drawing, which is a diagrammatic view of an automobile.

In the drawing, A is the source of power, B is the driving-motor, C and D are the conductors, E is the driving-wheel, F is the body, G is the starting, stopping, or controlling lever, H is the box, I is the steering-wheel, J is the brake mechanism, M is the source of braking power, as an electrically-driven gear-pump for compressing air, N is its motor, O is a power-storing device, as an air-tank, P is the seat, and Q is the platform or foot-rest.

The parts shown are diagrammatic illustrations representing any usual or suitable means, devices, and connections for constituting a power-operated device and are taken as convenient examples for illustrating one adaptation of my present improvements, for which examples any known or suitable substitutes may be employed without affecting the spirit of my invention. The source of power A may be any source of power, as an electric generator, steam or vapor engine, or compressed-air cylinder.

In power-driven devices, particularly vehicles, there is danger of uncontrolled operation in case the operator becomes incapacitated or displaced while a vehicle is moving or power is in operative connection with moving parts. My invention provides for automatically stopping operation of such devices in such a contingency and to this end provides, in combination therewith, means automatically terminating operative connection between the driving power and the driven part when the driver is displaced. This may be done in various ways, according to the character of vehicle or apparatus he controls; but I prefer to use his weight or position, or both, therefor, using any means operated by either or both these forces or conditions for controlling either the driving or the braking, or both, of the apparatus.

In the example shown the weight of the driver on the seat P and the footboard Q, or either, keeps the apparatus in operation and when this weight is removed throws the apparatus out of operation and applies the brake. An automatic cut-off R is shown for breaking the electric circuit, and an automatic controller S is shown for applying the brakes when the driver is removed. The cut-off is a snap-switch which is snapped to the open position by the rising of the spring-seat P or the footboard and to the closed position by the depression of either of these.

T is a power-storing spring which stores power for snapping the switch by acting on the cam U.

V represents opposite stops for the switch.

W is a slot in the seat-post Y, and X is a loose pin in the slot.

The controller S is a valve controlling flow of pressure to the brake.

The operation is so self-evident as to render further description here unnecessary.

For a tram-car the platform of the motorman will be the equivalent of Q; for a locomotive the engineer's seat and the floor. For a horse-driven vehicle the seat and footboard will be the parts, and braking apparatus will automatically be applied when these are not occupied. In a locomotive the steam will be shut off and the brakes applied, or either.

It will be seen that the invention provides improvements which can be variously and advantageously availed of by any one skilled in the arts to which it pertains.

What I claim is—

1. The combination with a power-driven apparatus, of means adapted to be displaced by the presence of the operator in a predetermined position, and adapted also to be displaced by the presence of the operator adjacent to said predetermined position, and adapted by such displacement to control said apparatus.

2. The combination with a power-driven apparatus, of mechanism for driving the same, means adapted to be displaced during the presence of the operator in a predetermined position, and adapted also to be displaced by the presence of the operator adjacent to said predetermined position, and adapted by such displacement to connect said driving mechanism to said apparatus, and means for disconnecting said driving mechanism upon complete removal of the operator from both such positions.

3. The combination with a power-driven apparatus, of means operated by a weight for controlling said apparatus, and operated also by the foot of the operator for controlling said apparatus.

4. A power-driven vehicle, in combination with means controlling the supply of driving power, a lost-motion device for operating said means, and provisions adapted to be displaced by the presence of the operator of the vehicle in a predetermined position and adapted by such displacement to control said last-mentioned device.

5. A power-driven apparatus controlled by a snap-switch, and means adapted to be displaced by the presence of the operator in a predetermined position and adapted by such displacement to operate said switch.

6. A power-driven apparatus, a source of power, a quick-action device for disconnecting said source of power and said apparatus, and means adapted to be displaced by the presence of the operator in a predetermined position and adapted by such displacement to control said device.

7. A brake for movable apparatus, and means adapted to be displaced by the presence of the operator in either of two positions and adapted when not so displaced to permit application of the brake, whereby application of said brake is permitted upon his absence from both said positions.

8. The combination with a power-driven vehicle, of means disconnecting the driving power thereof, and means applying the brake thereto upon removal of the driver from both a position on the vehicle-seat and a position adjacent to the seat.

9. In combination with a power-driven apparatus a device for disconnecting the driving power from said apparatus and means for operating said disconnecting device upon removal of the operator from both of two positions.

10. In combination with a power-driven apparatus a device adapted when displaced to connect the driving power with said apparatus, and means for so displacing said device by the presence of the operator in either of two predetermined positions.

11. A controller and a brake for a power-driven vehicle, and automatic means for operating said parts upon removal of the driver from both a position on the vehicle-seat and a position adjacent to the seat.

12. Means adapted to be displaced by the presence of the operator in a predetermined position and adapted also to be displaced by the presence of the operator adjacent to said predetermined position and to thereby connect the driving power to a power-driven apparatus, in combination with means for disconnecting the driving power, and means for applying a brake to such apparatus, upon removal of the operator from said predetermined position.

13. Means for connecting the driving power to a power-driven apparatus, in combination with means for disconnecting the driving power from such apparatus upon removal of the operator from both of two positions.

14. Means for connecting the driving power to a power-driven apparatus by the presence of the operator in either of two positions, and means for disconnecting the driving power from said apparatus upon removal of the operator from both of said positions.

15. Means for connecting the driving power to a power-driven apparatus, in combination with means operated by the weight of the operator in either of two positions, controlling said connection.

In witness whereof I have hereunto signed my name in the presence of two subscribing witnesses.

GEORGE HOLT FRASER.

Witnesses:
   Thomas F. Wallace,
   Fred White.